United States Patent Office 2,714,107
Patented July 26, 1955

2,714,107

RACEMIZATION PROCEDURE FOR 1-(P-METH-OXYBENZYL)-2 - METHYL - 1,2,3,4,5,6,7,8 - OCTA-HYDROISOQUINOLINE

Arnold Brossi, Basel, Switzerland, assignor to Hoffmann-La Roche Inc., Nutley, N. J., a corporation of New Jersey No Drawing. Application August 5, 1954,
Serial No. 448,142

Claims priority, application Switzerland August 13, 1953

6 Claims. (Cl. 260—288)

It is known that the two optical antipodes of 3-hydroxy-N-methylmorphinane and of its derivatives have different pharmacological activities (O. Schnider and A. Grüssner Helv. Chim. Acta 34, 2211 (1951)). Thus, the members of the (—)-series are powerful analgesics, whereas various compounds of the (+)-series possess an antirheumatic or cough-appeasing activity. It is, therefore, not to be expected that the demand will be uniformly the same for both optical antipodes. As the costs of these compounds are high, the fact of not utilizing the undesired optical antipode results in a considerable economical loss. It was, therefore, highly desirable to find means which would permit to convert the non valuable portion of optically active material into the valuable antipode. Usually this conversion is brought about by racemizing the undesired antipode after the optical separation and by recycling the racemate in the separation process. It has been found, however, that this method fails in the case of 3-hydroxy-N-methylmorphinane as it is not possible to racemize the 3-hydroxy-N-methyl-morphinanes due to their rigid structure.

It has been found that the above mentioned drawback can be overcome if the separation into the optical antipodes and the racemization are carried out by means of the last intermediate obtained in the synthesis of 3-hydroxy-N-methyl-morphinane by the method of Schnider and Hellerbach (Helv. Chim. Acta 33, 1437 (1950)), i. e. 1 - (p - methoxybenzyl) - 2 - methyl - 1:2:3:4:5:6:7:8-octahydroisoquinoline. Racemic 1-(p-methoxybenzyl)-2-methyl-1:2:3:4:5:6:7:8-octahydroisoquinoline is split into the optical antipodes and then one of these antipodes is converted into the desired optically active 3-hydroxy-N-methyl-morphinane by means of mineral acids. That optical antipode of 1-(p-methoxybenzyl)-2-methyl-1:2:3:-4:5:6:7:8-octahydroisoquinoline which would yield the undesired optically active 3-hydroxy-N-methyl-morphinane is subjected to racemization and thus can be recycled in the process. By repeating this racemization it is possible to convert any quantity of the undesired optical antipode of 1-(p-methoxybenzyl)-2-methyl-1:2:3:4:-5:6:7:8-octahydroisoquinoline into the desired antipode and thus to prepare any quantity of the desired optically active antipode of 3-hydroxy-N-methyl-morphinane.

A process for racemizing optically active 1-(p-methoxybenzyl)-2-methyl-1:2:3:4:5:6:7:8-octahydroisoquinoline has not been available up to now. Surprisingly it has been found that, when an optically active 1-(p-methoxybenzyl)-2-methyl-1:2:3:4:5:6:7:8-octahydroisoquinoline is oxidized with hydrogen peroxide, in addition to the expected N-oxide of the optically active material, an optically inactive compound of the empirical formula $C_{18}H_{25}O_2N$ is formed the constitution of which corresponds to that of a 2-(N-methyl-hydroxylaminoethyl)-4'-methoxy-3:4:5:6-tetrahydro-stilbene. Furthermore, it has been found that the optically active N-oxide can be converted into this optically inactive, hitherto unknown hydroxylamine compound by treatment with concentrated solutions of alkali hydroxides. When distilled under reduced pressure this optically inactive hydroxylamine compound surprisingly gives 1-(p-methoxybenzyl)-2-methyl-1:2:3:4:5:6:7:8-octahydroisoquinoline.

The present invention thus relates to a process for racemizing an optically active 1-(p-methoxybenzyl)-2-methyl-1:2:3:4:5:6:7:8-octahydroisoquinoline, comprising oxidizing an optically active 1-(p-methoxybenzyl)-2-methyl-1:2:3:4:5:6:7:8-octahydroisoquinoline with hydrogen peroxide, treating the obtained mixture of optically active N-oxide of 1-(p-methoxybenzyl)-2-methyl-1:2:3:-4:5:6:7:8-octahydroisoquinoline and optically inactive 2-(N-methyl-hydroxyaminoethyl) - 4' - methoxy - 3:4:5:6-tetrahydrostilbene with an alkali hydroxide solution at an elevated temperature and distilling the obtained uniform optically inactive 2-(N-methyl-hydroxylaminoethyl)-4'-methoxy-3:4:5:6-tetrahydrostilbene under reduced pressure.

A convenient mode of operation consists in separating the mixture formed by oxidation with hydrogen peroxide into the easily water-soluble optically active N-oxide of 1-(p-methoxybenzyl)-2-methyl-1:2:3:4:5:6:7:8-octahydroisoquinoline and the difficultly soluble optically inactive 2-(N-methyl-hydroxylaminoethyl) - 4' - methoxy - 3:4:5:6 - tetrahydrostilbene, converting the optically active N-oxide into the optically inactive hydroxylamine compound by heating with an alkali hydroxide solution and distilling the combined quantities of the hydroxylamine compound under reduced pressure.

The optically active 1-(p-methoxybenzyl)-2-methyl-1:2:3:4:5:6:7:8-octahydroisoquinolines can be obtained from the known racemate as follows:

75 parts by weight of racemic 1-(p-methoxybenzyl)-2 - methyl - 1:2:3:4:5:6:7:8-octahydroisoquinoline are dissolved with 41.5 parts by weight of D-(+)-tartaric acid in 425 parts by volume of methanol on a steam bath. The solution is allowed to stand for 24 hours and then the mixture is filtered by suction. The filtrate is concentrated, again allowed to stand and again filtered by suction. The obtained two salt fractions have the following constants: Fraction 1: 42 parts by weight; M. P. 162 to 167° C.

$[\alpha]_D^{20} = +47.6°$ ($c=2$ in methanol)

Fraction 2: 12.5 parts by weight; M. P. 165 to 168° C.

$[\alpha]_D^{20} = +42°$ ($c=2$ in methanol)

On recrystallization of these two fractions from methanol the tartrate of that 1-(p-methoxybenzyl)-2-methyl-1:2:3:4:5:6:7:8-octahydroisoquinoline which is levogyric in ether is obtained in pure form. This tartrate melts at 173 to 174° C.; $[\alpha]_D^{20} = +48.8°$ ($c=2$ in methanol). The base obtained from this tartrate by decomposition with ammonia and extraction with ether is an oil having a rotation value of $[\alpha]_D^{20} = -78.5°$ ($c=3$ in ether).

The methanolic mother liquor remaining after isolation of the sparingly soluble tartrate of that 1-(p-methoxybenzyl)-2-methyl-1:2:3:4:5:6:7:8 - octahydroisoquinoline which is levogyric in ether, is concentrated to remove the methanol and the residue is taken up in acetone, and induced to crystallize by allowing to stand and inoculating the solution. On recrystallization of the product from acetone the tartrate of that 1-(p-methoxybenzyl)-2-methyl-1:2:3:4:5:6:7:8-octahydroisoquinoline which is dextrogyric in ether is obtained in a pure form. This tartrate melts at 130 to 132° C.; $[\alpha]_D^{20} = -26°$ ($c=2$ in methanol). The 1-(p-methoxybenzyl)-2-methyl-1:2:3:4:5:6:7:8-octahydroisoquinoline which is dextrogyric in ether is obtained from the tartrate as an oil having a rotation value of $[\alpha]_D^{20} = +77.5°$ ($c=3$ in ether).

The present invention is further illustrated, but not limited in the following examples.

*Example 1*

109 parts by weight of (+)-1-(p-methoxybenzyl)-2-methyl-1:2:3:4:5:6:7:8-octahydroisoquinoline are mixed, while stirring, with 98 parts by volume of a 30% hydrogen peroxide solution. The temperature is controlled by cooling so that it does not exceed 60° C. The reaction mixture is stirred at this temperature until it becomes clear. After diluting with the same volume of water the mixture is cooled with ice and 30 parts by weight of manganese dioxide are added thereto, while stirring. After standing over night the mixture is filtered, and the filtrate is saturated with common salt and exhaustively extracted with chloroform. The chloroform extract is concentrated and to the concentrate the same quantity by weight of a 44% aqueous potassium hydroxide solution is added and the mixture is vigorously stirred at 110 to 120° C. for one hour. After cooling, the oil which has separated is decanted, repeatedly washed with fresh portions of water and finally triturated with petroleum ether. In this manner 70 parts by weight of crystalline, light-yellow, optically inactive 2-(N-methyl-hydroxylaminoethyl)-4'-methoxy-3:4:5:6-tetrahydrostilbene melting at 120 to 123° C. are obtained.

For conversion into the racemic 1-(p-methoxybenzyl)-2-methyl-1:2:3:4:5:6:7:8-octahydroisoquinoline the obtained hydroxylamine compound is distilled under reduced pressure. The fraction distilling between 150 and 170° C. (0.01 mm.) is collected and the calculated quantity of oxalic acid is added to this fraction in acetone, whereupon the oxalate of the racemic 1-(p-methoxybenzyl)-2-methyl-1:2:3:4:5:6:7:8-octahydroisoquinoline melting at 162 to 164° C. precipitates. The free base may be obtained from the oxalate in the usual manner.

*Example 2*

117 parts by weight of (−)-1-(p-methoxybenzyl)-2-methyl-1:2:3:4:5:6:7:8-octahydroisoquinoline are oxidized with hydrogen peroxide solution and worked up as described in Example 1. Ethyl acetate is added to the obtained chloroform extract and the mixture is allowed to stand in the cold. The optically active N-oxide of the (−)-1-(p-methoxybenzyl)-2-methyl-1:2:3:4:5:6:7:8-octahydroisoquinoline which has crystallized out is filtered off, subjected to suction and dried. The mother liquor is concentrated and water is added to the concentrate. After standing over night 40 parts by weight of crystalline, optically inactive 2-(N-methyl-hydroxylaminoethyl)-4'-methoxy-3:4:5:6-tetrahydrostilbene melting at 120 to 123° C. have separated out which are isolated. By extraction with chloroform of the mother liquor saturated with common salt a further crop of the optically active N-oxide can be recovered. In this manner a total of 50 parts by weight of the crystal water-containing N-oxide of the empirical formula $C_{18}H_{25}O_2N \cdot H_2O$ is obtained. After recrystallization from ethyl acetate the N-oxide melts at 150 to 152° C. (after preceding sintering). $[\alpha]_D^{20} = +22°$ ($c=1.0$ in methanol).

To 50 parts by weight of the crystal water-containing, optically active N-oxide 38 parts by volume of a 44% potassium hydroxide solution are added and the mixture is heated at 130° C. for one hour, while stirring. After cooling the reaction mixture is worked up as described in Example 1. 35 parts by weight of the optically inactive hydroxylamine compound melting at 120 to 123° C. are obtained which is treated as described in Example 1 to convert it into the racemic 1-(p-methoxybenzyl)-2-methyl-1:2:3:4:5:6:7:8-octahydroisoquinoline.

What we claim is:

1. A process for racemizing optically active 1-(p-methoxybenzyl)-2-methyl-1:2:3:4:5:6:7:8-octahydroisoquinoline, comprising oxidizing an optically active 1-(p-methoxybenzyl)-2-methyl-1:2:3:4:5:6:7:8-octahydroisoquinoline with hydrogen peroxide, treating the obtained mixture of optically active N-oxide of 1-(p-methoxybenzyl)-2-methyl-1:2:3:4:5:6:7:8-octahydroisoquinoline and optically inactive 2-(N-methyl-hydroxyaminoethyl)-4'-methoxy-3:4:5:6-tetrahydrostilbene with an alkali hydroxide solution at elevated temperature and distilling the obtained uniform optically inactive 2-(N-methyl-hydroxylaminoethyl)-4'-methoxy-3:4:5:6-tetrahydrostilbene under reduced pressure.

2. A process as claimed in claim 1, comprising oxidizing an optically active 1-(p-methoxybenzyl)-2-methyl-1:2:3:4:5:6:7:8-octahydroisoquinoline with hydrogen peroxide, separating from the obtained mixture the easily water-soluble optically active N-oxide of 1-(p-methoxybenzyl)-2-methyl-1:2:3:4:5:6:7:8-octahydroisoquinoline from the difficultly water-soluble optically inactive 2-(N-methyl-hydroxylaminoethyl)-4'-methoxy-3:4:5:6-tetrahydrostilbene, converting the said N-oxide into the said stilbene compound by treatment with an alkali hydroxide solution at elevated temperature and distilling the combined quantities of the optically inactive 2-(N-methyl-hydroxylaminoethyl)-4'-methoxy-3:4:5:6-tetrahydrostilbene under reduced pressure.

3. 2-(N-methyl-hydroxylaminoethyl)-4'-methoxy-3:4:5:6-tetrahydrostilbene.

4. N-oxide of 1-(p-methoxybenzyl)-2-methyl-1:2:3:4:5:6:7:8-octahydroisoquinoline.

5. A process for producing 2-(N-methyl-hydroxylaminoethyl)-4'-methoxy-3:4:5:6-tetrahydrostilbene which comprises treating the N-oxide of 1-(p-methoxybenzyl)-2-methyl-1:2:3:4:5:6:7:8-octahydroisoquinoline with an alkali hydroxide solution at elevated temperature.

6. A process for producing 1-(p-methoxybenzyl)-2-methyl-1:2:3:4:5:6:7:8-octahydroisoquinoline which comprises distilling 2-(N-methyl-hydroxylaminoethyl)-4'-methoxy-3:4:5:6-tetrahydrostilbene under reduced pressure.

References Cited in the file of this patent

UNITED STATES PATENTS 2,676,177   Schnider et al. _____ Apr. 20, 1954

FOREIGN PATENTS 899,354   Germany _____ Dec. 10, 1953